(12) United States Patent
Rodriguez Erdmenger et al.

(10) Patent No.: US 8,135,245 B2
(45) Date of Patent: Mar. 13, 2012

(54) FIBER OPTIC SENSING SYSTEM

(75) Inventors: Rodrigo Rodriguez Erdmenger, Munich (DE); Eric John Ruggiero, Rensselaer, NY (US); Alexander Kimberley Simpson, Munich (DE); Christopher Edward Wolfe, Niskayuna, NY (US)

(73) Assignee: General Electric Company, Niskayuna, NY (US)

( * ) Notice: Subject to any disclaimer, the term of this patent is extended or adjusted under 35 U.S.C. 154(b) by 524 days.

(21) Appl. No.: 12/329,352

(22) Filed: Dec. 5, 2008

(65) Prior Publication Data

US 2010/0142880 A1    Jun. 10, 2010

(51) Int. Cl.
*G02B 6/00* (2006.01)
*G02B 6/34* (2006.01)

(52) U.S. Cl. ............................. 385/12; 385/37
(58) Field of Classification Search ......... 385/12
See application file for complete search history.

(56) References Cited

U.S. PATENT DOCUMENTS

| | | | |
|---|---|---|---|
| 6,712,084 B2 | 3/2004 | Shajii et al. | |
| 6,740,866 B1 | 5/2004 | Bohnert et al. | |
| 6,813,962 B2 | 11/2004 | Gysling et al. | |
| 6,923,048 B2 | 8/2005 | Willsch et al. | |
| 6,981,406 B2 | 1/2006 | Willner | |
| 7,149,374 B2 | 12/2006 | Lagakos et al. | |
| 7,207,214 B1 | 4/2007 | Wlodarczyk | |
| 7,322,247 B2 | 1/2008 | Boyd et al. | |
| 2003/0206677 A1 | 11/2003 | Sheem | |
| 2004/0031326 A1 | 2/2004 | Lenzing et al. | |
| 2006/0170909 A1 | 8/2006 | Wlodarczyk et al. | |

FOREIGN PATENT DOCUMENTS

| | | |
|---|---|---|
| EP | 1012553 B1 | 11/2003 |
| JP | 2005003535 | * 1/2005 |

* cited by examiner

*Primary Examiner* — Uyen Chau N Le
*Assistant Examiner* — Kajli Prince
(74) *Attorney, Agent, or Firm* — Ann M. Agosti

(57) ABSTRACT

A fiber optic sensing system comprises a housing disposed in a flow path, and a fiber optic sensor. The fiber optic sensor comprises an optical fiber secured in the housing, a Bragg grating, a light source for transmitting light to the optical fiber, and a detector for detecting light filtered by the Bragg grating of the optical fiber and monitoring wavelength changes of the detected light. The fiber is substantially perpendicular to the flow path. The housing defines an opening at an upstream side to allow flow through the flow path to exert a pressure on the optical fiber and cause a deformation of the Bragg grating.

25 Claims, 8 Drawing Sheets

FIBER OPTIC SENSING SYSTEM

BACKGROUND

The invention relates generally to sensing technologies and, more particularly, to fiber optic sensing devices.

Various sensing devices are known for measuring fluid or gas flow parameters such as flow velocity, pressure, temperature, mass flow, and the like. However, for flow measurement through passages that are difficult to access, such as cooling flows or leakage flow through seals, conventional sensing devices are relatively complex to implement.

It would be desirable to have an improved sensing device with a relatively small size.

BRIEF DESCRIPTION

In accordance with an embodiment disclosed herein, a fiber optic sensing system is provided. The fiber optic sensing system comprises a housing disposed in a flow path, and a fiber optic sensor. The fiber optic sensor comprises an optical fiber secured in the housing, a Bragg grating, a light source for transmitting light to the optical fiber, and a detector for detecting light filtered by the Bragg grating of the optical fiber and monitoring wavelength changes of the detected light. The fiber is substantially perpendicular to the flow path. The housing defines an opening at an upstream side to allow flow through the flow path to exert a pressure on the optical fiber and cause a deformation of the Bragg grating.

In accordance with another embodiment disclosed herein, a fiber optic sensing system is provided. The fiber optic sensing system comprises a housing disposed in a flow path, and a fiber optic sensor. The fiber optic sensor comprises an optical fiber secured in the housing. The optic fiber is substantially perpendicular to the flow path, and comprises a first section including a first Bragg grating for measurement of a differential pressure within the flow path, a second section including a second Bragg grating for measurement of a total pressure within the flow path, and a third section including a third Bragg grating for measurement of a temperature within the flow path. The fiber optic sensor further comprises a light source for transmitting light through the fiber, and a detector for detecting light filtered by the Bragg gratings of the optical fiber and monitoring wavelength changes of the detected light.

DRAWINGS

These and other features, aspects, and advantages of the present invention will become better understood when the following detailed description is read with reference to the accompanying drawings in which like characters represent like parts throughout the drawings, wherein.

DETAILED DESCRIPTION

Embodiments of the invention disclose fiber optic sensing systems for measurements of fluid (liquid or gas) flow parameters. The fiber optic sensing systems include fiber optic sensors, each of which has a Bragg grating. By monitoring changes of wavelength in detected light, differential pressure, static pressure, flow velocity, and/or temperature of the flow can be measured. For purposes of simplicity of description, common elements across different embodiments share the same reference numbers.

Figure 1:
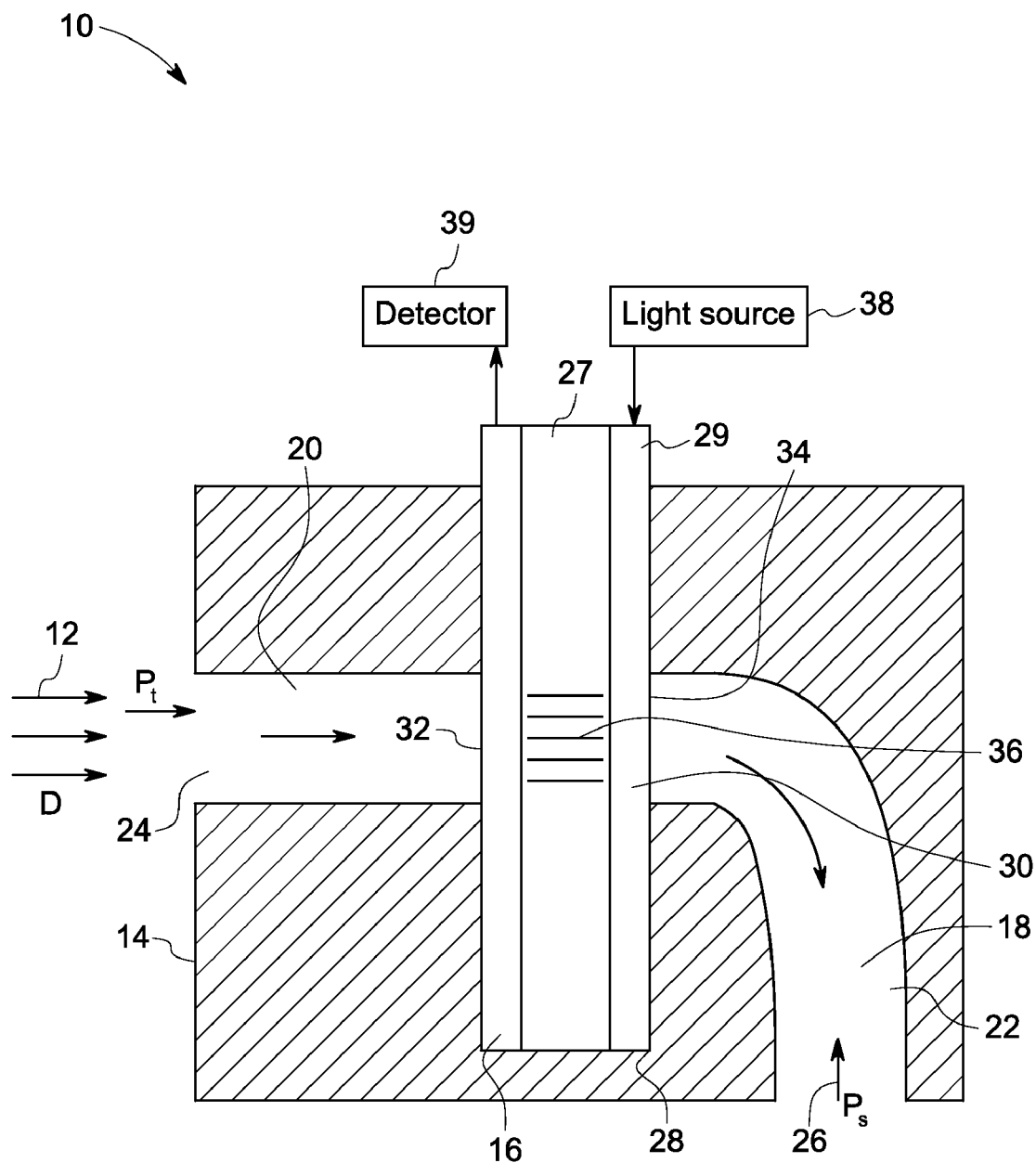
FIG. 1 is a cross-sectional view of a fiber optic sensing system for measuring a differential pressure of a flow according to one embodiment of the invention.

FIG. 1 illustrates a fiber optic sensing system 10 comprising a housing 14 disposed in a flow path 12 and a fiber optic sensor 16. Fiber optic sensor 16 comprises an optical fiber 28 secured in the housing 14 and has a Bragg grating 36 thereon. Fiber 28 is substantially perpendicular to the flow path, and housing 14 defines an opening at the upstream side to allow flow through the flow path to exert a pressure on fiber 14 and cause a deformation of Bragg grating 36. Fiber optic sensor 16 further comprises a light source 38 for transmitting light through fiber 28 and a detector 39 for detecting light filtered by the Bragg grating of the optical fiber and monitoring wavelength changes of the detected light.

FIG. 1 further illustrates an exemplary fiber optic sensing system 10 for measuring differential pressure in flow path 12. Flow of fluid through flow path 12 is generally in a flow direction D, and accordingly, as used herein after, the term "downstream" and "upstream" are both defined with respect to the flow direction D. In the embodiment of FIG. 1, housing 14 includes a substantially right-angled tunnel 18 with an upstream channel 20 in the flow direction D and a downstream channel 22 substantially perpendicular to the flow direction D. Upstream and downstream channels 20 and 22 respectively include an upstream opening 24 in a front surface of housing 14 and a downstream opening 26 in a bottom surface of housing 14. In the embodiment of FIG. 1, fiber optic sensor 16 includes an optical fiber 28 situated generally perpendicular to the flow direction D, with upper and lower ends secured and sealed in housing 14 such that the fiber ends are not in contact with flow path 12. Fiber 28 includes a core 27 and an outer layer 29 surrounding core 27, and a middle portion 30 of fiber 28 is situated in upstream channel 22 and adjacent to downstream channel 24.

Fluid thus flows into tunnel 18 from upstream opening 24 and out of tunnel 18 from downstream opening 26 with middle portion 30 of fiber 28 having one side 32 related by a total pressure Pt of the fluid flow and another side 34 subject to a static pressure Ps of the fluid flow. The total pressure Pt and static pressure Ps exerted on fiber 28 due to flow 12 is subject to Bernoulli's equation:

$$Pt = Ps + Pd,$$

wherein "Pd" is a dynamic pressure or differential pressure which is proportional to the square of flow velocity according to the following equation:

$$P_d = \frac{1}{2}\rho \cdot u^2,$$

wherein ρ is the fluid density in kg/m³ and u is the fluid velocity in m·s⁻¹. Accordingly, deflection of fiber 28 is proportional to the differential pressure Pd, and in turn is an indication of flow velocity u.

With continued reference to FIG. 1, fiber optic sensor 16 further includes a Bragg grating 36 in fiber 28, a light source 38 for emitting light to fiber 28, and a detector 39 receiving light reflected from Bragg grating 36. In one embodiment, Bragg grating 36 comprises a distributed, periodic grating in the middle portion 30 of fiber 28, while in another embodiment, Bragg grating 36 is situated below or above the middle portion 30 in fiber 28. Light source 38 may comprise, for example, a tunable laser, an LED, a laser diode, or any other quasi-monochromatic source, which can be scanned through a range of wavelengths, typically 1400 to 1500 nanometers.

Bragg grating 36 may be formed on fiber 28 by any method known in the art, and in one example, such fabrication includes use of an interference pattern of ultraviolet light to create a permanent modulation of refractive index. When light from light source 38 is transmitted through fiber 28 to Bragg grating 36, light energy is reflected by the Bragg grating at a corresponding Bragg wavelength given by the following equation:

$$\lambda_B = 2n_{\mathit{eff}}\Lambda,$$

wherein "$\lambda_B$" represents the Bragg wavelength, "$n_{\mathit{eff}}$" is the index of refraction, and "$\Lambda$" is the period of the grating. Both the index of refraction, $n_{\mathit{eff}}$, and the period, $\Lambda$, of the grating 36 are functions of temperature and strain. Thus, the differential pressure Pd exerted on the Bragg grating 36 induces a strain on 36 that leads to changes of the Bragg wavelength of the reflected light.

Figure 2:
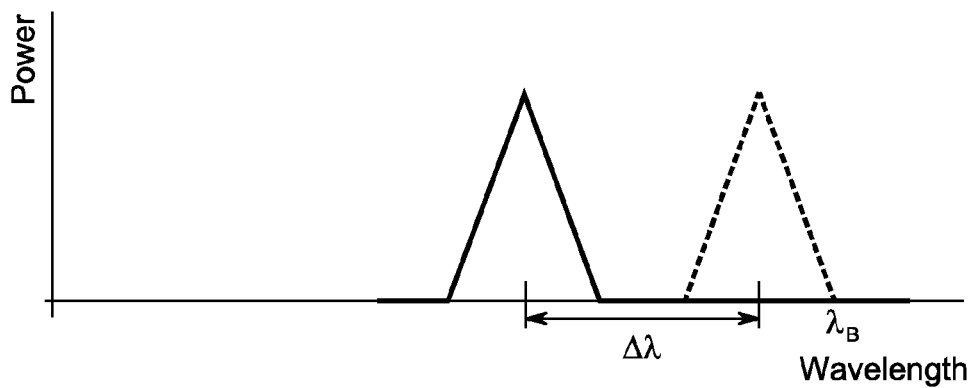
FIG. 2 illustrates a wavelength change of Bragg grating due to a pressure exerted on a fiber.

As shown in FIG. 2, a waveform in solid line is the original wavelength λ without pressure exerted perpendicularly on fiber 28, and a waveform in phantom line is the shifted wavelength λ caused by a differential pressure Pd. Accordingly, by correlating the shift Δλ of the Bragg wavelength with the differential pressure Pd, the differential pressure Pd can thus be obtained by monitoring the Bragg wavelength shifting Δλ. Fiber optic sensors are useful as being relatively small in size and sensitive to strains. Thus the fiber optic sensing system 10 can be used in flow areas that are difficult to access, such as cooling flows or leakage flows through seals in a gas turbine machine.

Figure 3:
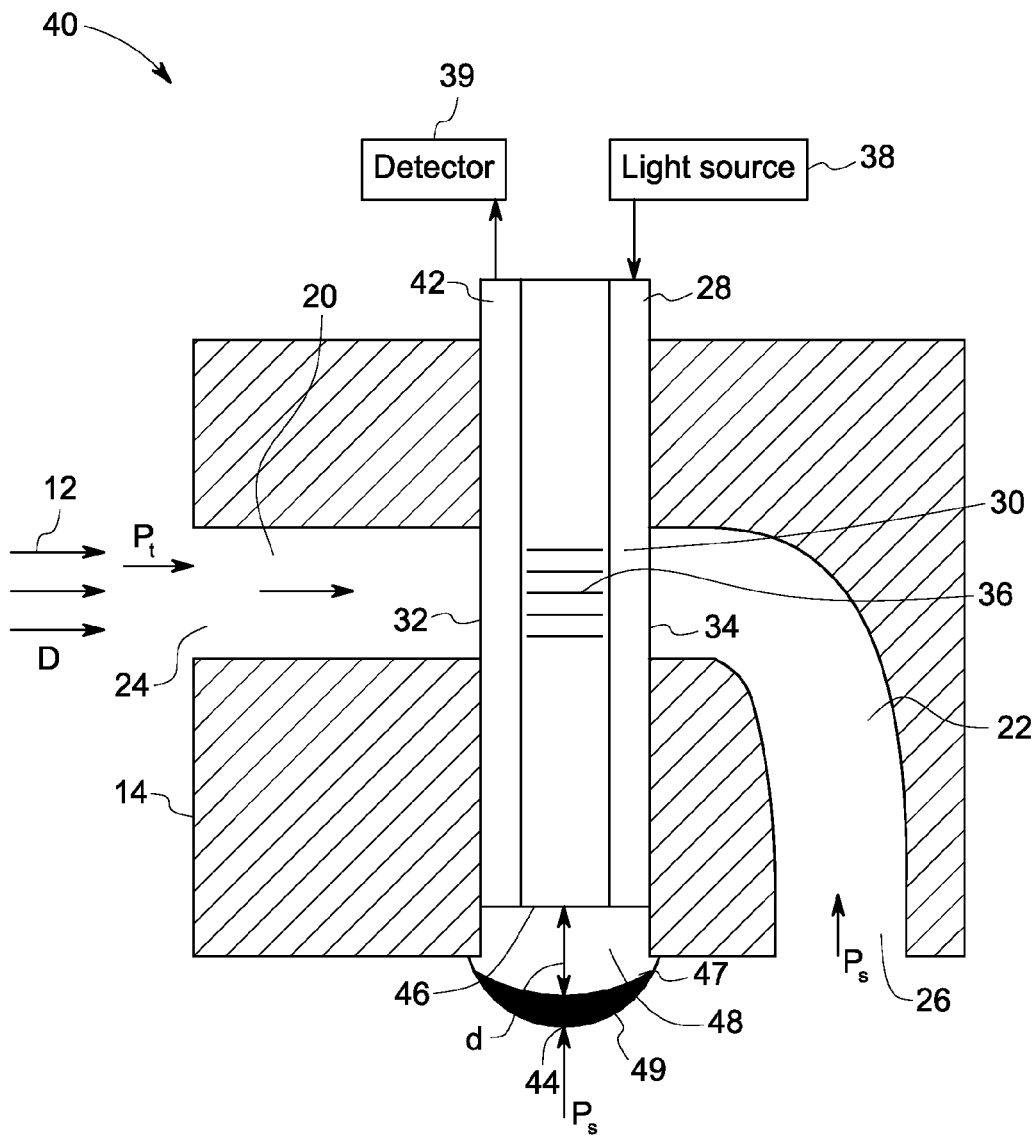
FIG. 3 is a cross-sectional view of a fiber optic sensing system for measuring differential pressure and static pressure of the flow according to another embodiment of the invention.

FIG. 3 shows a fiber optic sensing system 40 according to another embodiment of the invention for measurement of both differential pressure Pd and static pressure Ps wherein a fiber optic sensor 42 comprises a Fabry-Perot optic sensor including a dielectric membrane 44 secured at a lower end portion of housing 14 and below fiber 28. Fiber 28 includes a lower end 46. Membrane 44 includes an inner surface 47 facing fiber 28, and an outer surface 49 exposed to flow path 12 and subject to static pressure Ps. A cavity 48, with a distance d, is formed between lower end 46 of fiber 28 and inner surface 47 of membrane 44.

Figure 4:
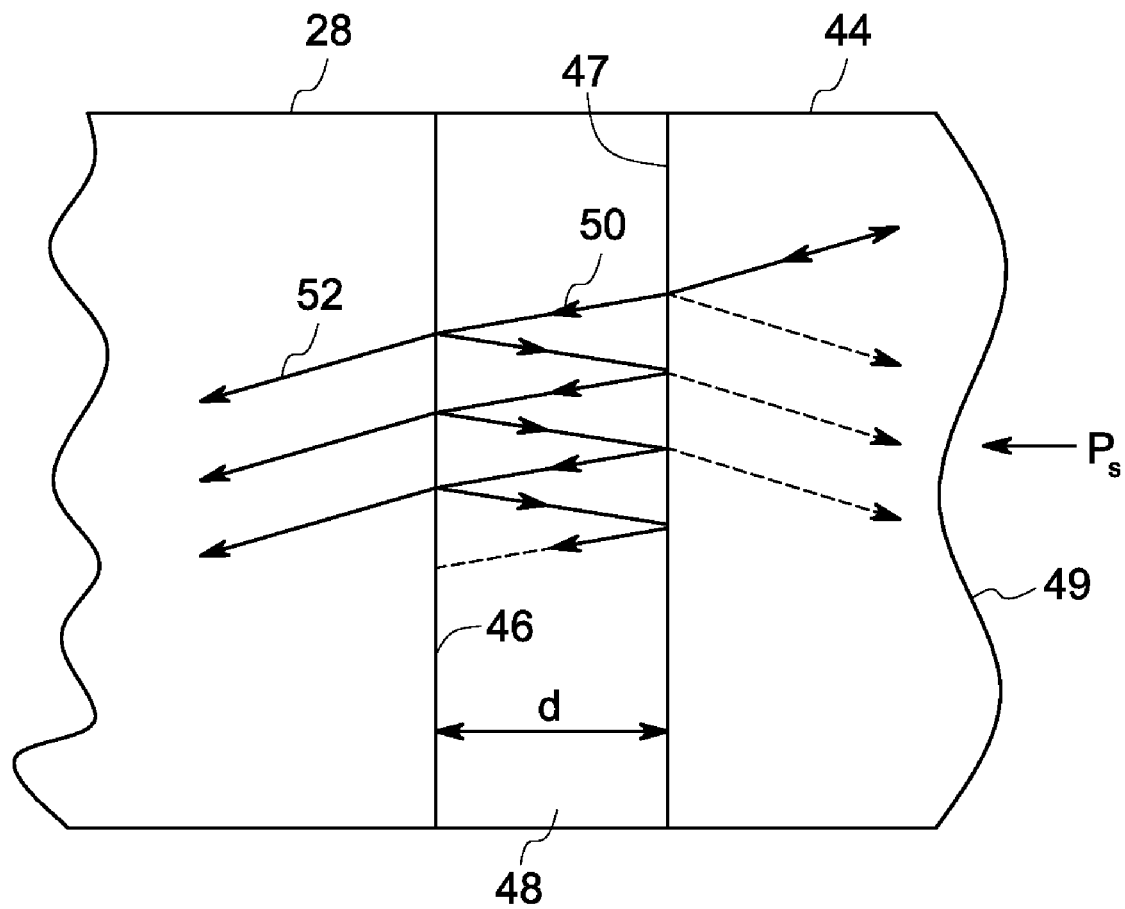
FIG. 4 is an enlarged view illustrating reflection and transmission of light in a cavity in the fiber optic sensing system of FIG. 3.

Referring to FIG. 4, light from light source 38 (FIG. 3) transmits through fiber 28 and is partially beamed into cavity 48. The lower end of fiber 28 and membrane 44 respectively have reflective indexes $n_1$ and $n_2$, and, in one embodiment, $n_1=n_2$. Cavity 48 has a reflective index $n_c$ which is different from reflective indices $n_1$ and $n_2$. The light beamed in cavity 48 includes a reflective light component 50 that reflects between lower end 46 of fiber 28 and membrane 44 in cavity 48, and a transmitted light component 52 transmitted out of cavity 48 through lower end 46 of fiber 28 and received by detector 38. Assuming normal reflection conditions, the transmitted light component 52 does not further interact with cavity 48. Outer surface 49 of membrane 44 is exposed to the static pressure Ps to be measured. An increase in the static pressure Ps causes membrane 44 to be deflected towards cavity 48. Inner surface of membrane 44 is curved as consequence of a pressure increase so that the angle of reflection for the light reflected on the inside surface of membrane 44 is changed. The intensity of the light reaching detector 38 relative to the intensity of the light in cavity 48 is correlated with the pressure (static pressure Ps) acting on the outer surface 49 of the membrane 44. Accordingly, by measuring the intensity light from cavity 48, the static pressure Ps can be measured.

Figure 5:
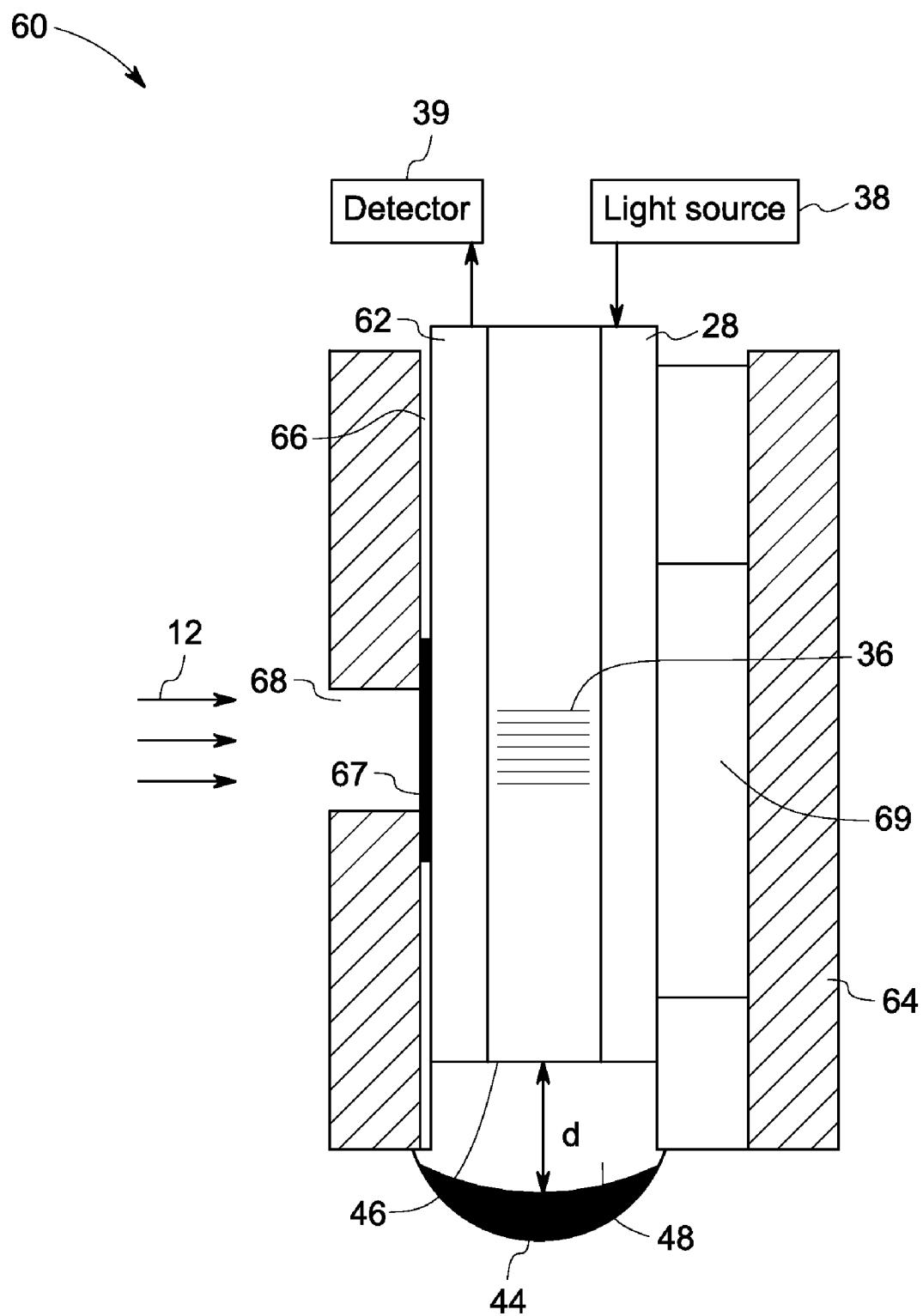
FIG. 5 is a cross-sectional view of a fiber optic sensing system for measuring total pressure and static pressure of the flow according to still another embodiment of the invention.

FIG. 5 illustrates a fiber optic sensing system 60 according to another embodiment of the invention for measuring both total pressure Pt and static pressure Ps within flow path 12. The illustrated fiber optic sensing system 60 includes a longitudinal housing 64 with a central slot 66 therein, and fiber optic sensor 62 secured in central slot 66 of housing 64. Fiber optic sensor 62 has a similar configuration with fiber optic sensor 42 of FIG. 3, and has fiber 28 secured in central slot 66 of housing 64, Bragg grating 36 in fiber 28, a membrane 44 below a lower end 46 of fiber 28, and a cavity 48 between lower end 46 and membrane 44.

Housing 64 is disposed in flow path 12 in a direction substantially perpendicular to flow direction D. Housing 64 has an upstream opening 68 through an upstream side thereof in communication with central slot 66. Total pressure Pt exerts on fiber 28 through opening 68, and causes a deformation of fiber 28, and, in turn, causes wavelength shifting of light through Bragg grating 36 as discussed above. By monitoring wavelength shifting of Bragg grating 36, total pressure Pt of flow 12 can be obtained. In certain embodiments, fiber optic sensing system 60 further comprises a sealing membrane 67 for preventing flow 12 to flow into central slot 66 through opening 68 but for passing total pressure Pt of flow 12 to fiber 28. In certain embodiments, a groove 69 is defined in fiber 28 adjacent to a downstream side of fiber 28 to allow a deformation of fiber 28 under total pressure Pt.

Membrane 44 is secured to a lower end of housing 64 and subject to static pressure Ps. As discussed above, change of distance d of cavity 48 causes intensity change of cavity 48 which is correlated to the static pressure Ps. Accordingly, by monitoring intensity change of cavity 48, static pressure Ps of flow 12 can be obtained.

Figure 6:
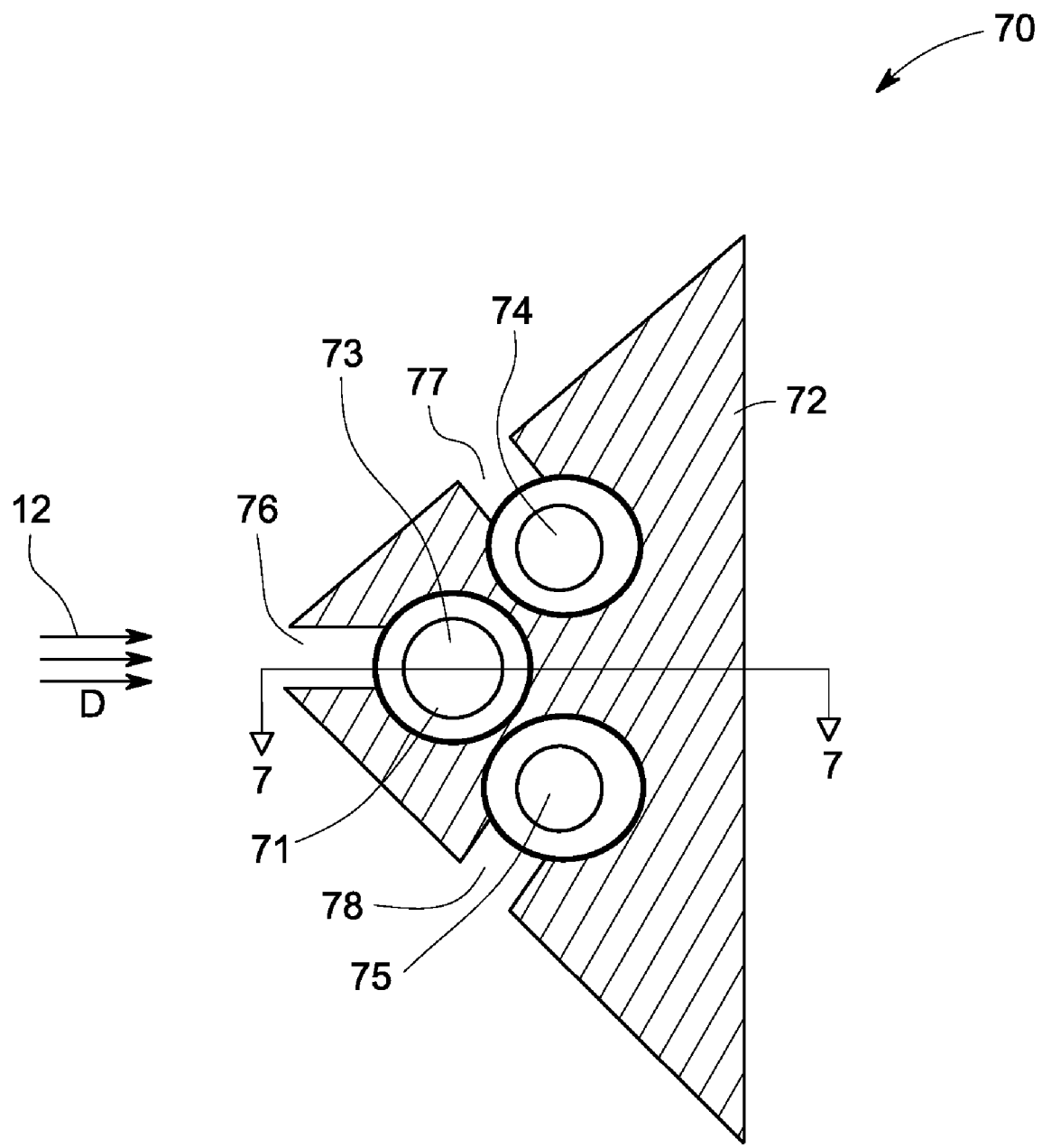
FIG. 6 is a cross-sectional view of a fiber optic sensing system for measuring flow direction and total pressure of the flow according to still another embodiment of the invention.
Figure 7:
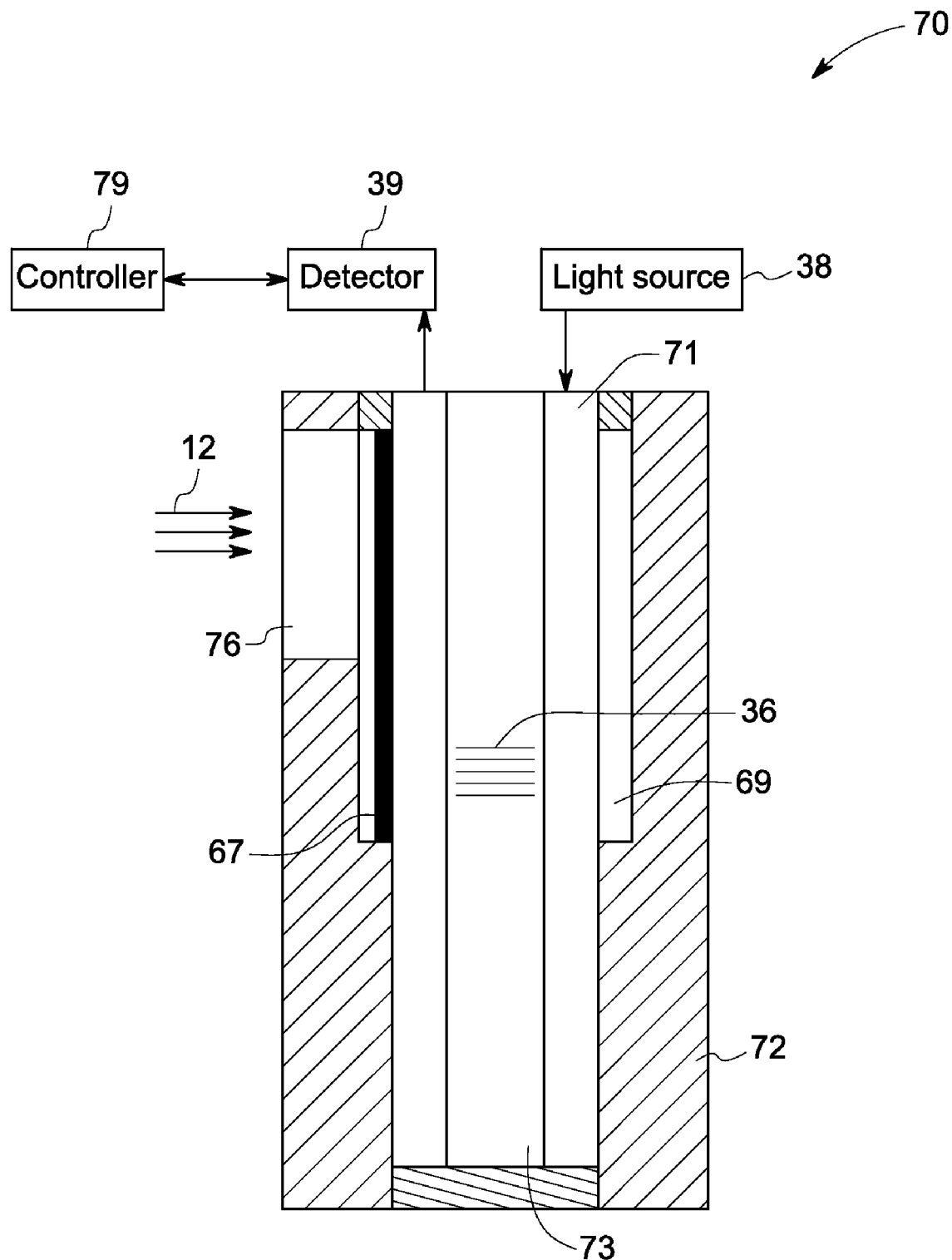
FIG. 7 is a cross-sectional view of the fiber optic sensing system along line 7-7 of FIG. 6.

FIGS. 6 and 7 illustrate a fiber optic sensing system 70 according to another embodiment of the invention for measuring flow direction and total pressure Pt of flow 12. Referring to FIG. 6, fiber optic sensing system 70 includes a fiber optic sensor 71 and a housing 72 to hold fiber optic sensor 71. In one embodiment, fiber optic sensor 71 includes at least three fibers including first, second, and third fibers 73, 74, and 75. In one embodiment, housing 72 has an isosceles triangular cross section with a tip of the isosceles triangle generally confronting flow through flow path 12 and two sides symmetrically distributed with respect to the general flow direction. A first opening 76 is defined in the tip of housing 72, and second and third openings 77 and 78 are symmetrically distributed on the two sides. First, second, and third fibers 73, 74, and 75 are secured in housing 72 and respectively each have a portion exposed in first, second and third openings 76, 77, and 78. In other embodiments, the housing may have a polygonal cross section with an odd number of sides. The flow is incident onto the sensor mounted in a tip of the polygon through flow path 12. At least one pair of sides is symmetrically distributed with respect to the general flow direction and each side defines an opening. In still another embodiment, housing 72 may have other cross-sectional shapes. First, second and third fibers 73, 74 and 75 each have a measurement plane exposed to openings 76, 77 and 78, and orientation of the measurement planes are angled to one other.

Each of the fibers 73, 74, and 75 includes a Bragg grating 36. In some embodiments, each Bragg grating 36 is the same. Referring to the description above with respect to FIG. 5, each of the fibers 73, 74, and 75 deforms due to the flow of fluid through flow path 12. When flow is exactly in flow direction D, then the wavelength of light transmitted or reflected from Bragg grating 36 in first fiber 73 is an indication of total pressure Pt, while pressures impacting by Bragg grating 36 of second and third fibers 74 and 75 are less than the total pressure, and result in the same wavelength shift. When the flow direction changes, there will be a decrease on the sensed total pressure that impacts Bragg grating 36 of first fiber 73, and pressures sensed by second and third fibers 74 and 75 change. By prior calibration and construction of a look up table, for example, the flow direction and total pressure can be deduced. In one embodiment, fiber optic sensor 71 further comprises a controller 79 (FIG. 7) for receiving signals from detector 39 and estimating the flow direction. In another embodiment, the controller 79 is embedded within detector 39 such that detector 39 performs the estimation function. In still another embodiment, the velocity and its direction can be determined by means of an algorithm developed during calibration of the fiber optic sensor 71, which may be implemented on a computer, or on a similar data acquisition system.

Referring to FIG. 7, which illustrates a cross sectional view along line 7-7 of FIG. 6, in one embodiment, a sealing membrane 67 is provided between first fiber 73 and first opening 76 for preventing flow 12 to flow into housing 72 through first opening 76 but permitting pressure of flow 12 to reach first fiber 73. In certain embodiments, opening 76 is situated so as to not be adjacent to Bragg grating 36 of first fiber 73 in order to protect Bragg grating 36 from being damaged. In one embodiment, groove 69 is provided in downstream direction with respect to Bragg grating 36 to allow a sufficient deformation of first fiber 73 under pressure of flow 12. In certain embodiments, housing 72 has similar arrangement for holding the second and third fibers 74 and 75 as that for first fiber 73 of FIG. 7.

Figures 8, 9:
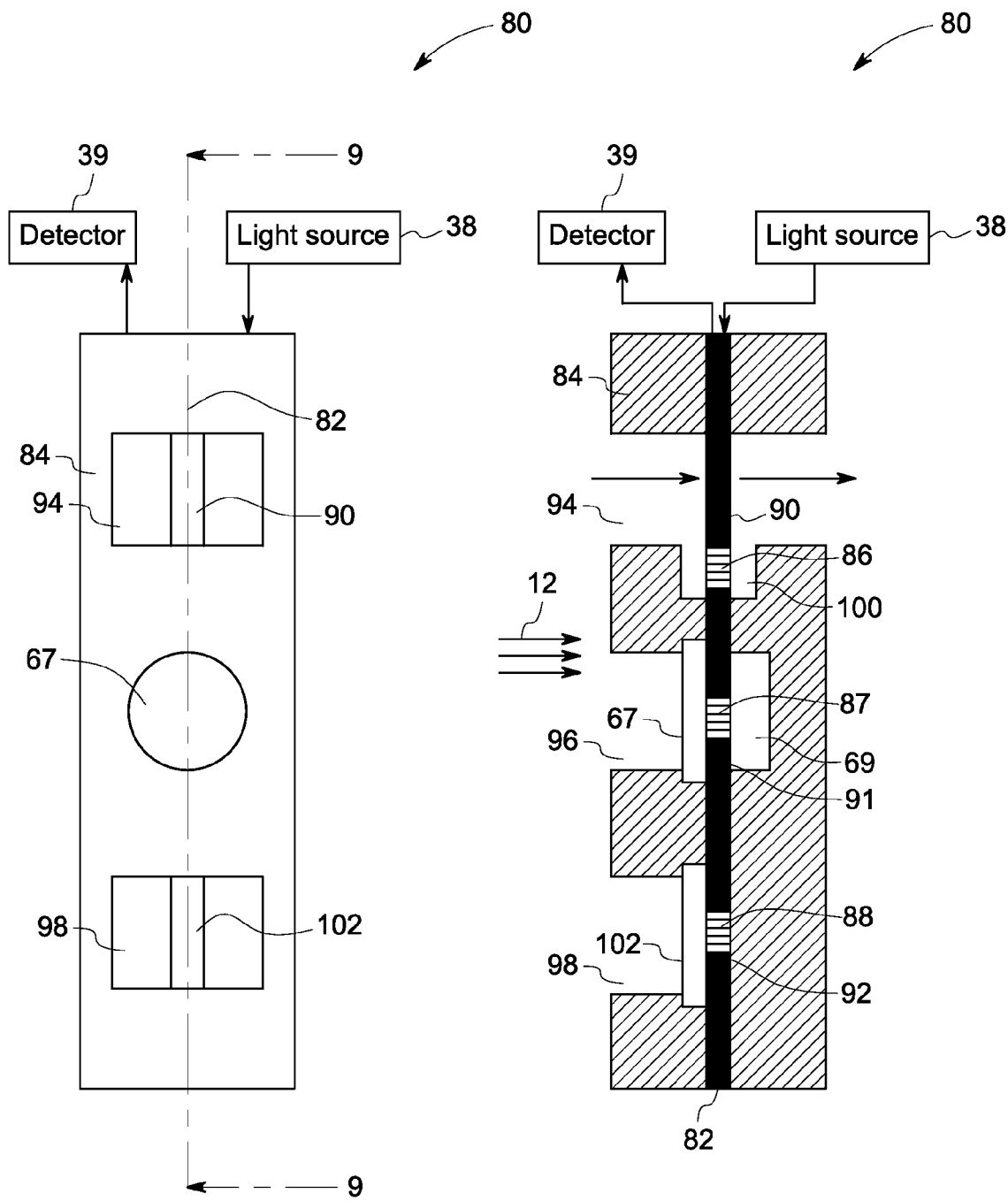
FIG. 8 is a side view of a fiber optic sensing system for measuring total pressure, differential pressure, and temperature of the flow according to still another embodiment of the invention.
FIG. 9 is a cross-sectional view along line 9-9 of FIG. 8.

FIGS. 8 and 9 illustrate a fiber optic sensing system 80 according to another embodiment of the invention for measuring total pressure Pt, differential pressure Ps, and temperature within flow path 12. Fiber optic sensing system 80 includes a fiber 82, a housing 84 holding fiber 82, and first, second, and third Bragg gratings 86, 87, and 88 in fiber 82 for respectively measuring differential pressure Pd, total pressure Pt, and temperature. In one embodiment, Bragg gratings 86, 87, and 88 are in one common fiber 82. Referring to FIGS. 8 and 9, housing 84 is disposed in flow path 12 and is arranged in a manner that fiber 82 retained in housing 84 in a direction substantially perpendicular to the flow direction. Fiber 82 includes first, second, and third sections 90, 91, and 92 respectively holding first, second, and third Bragg gratings 86, 87 and 88. Housing 84 includes a side through hole 94 generally in the flow direction and adjacent to first section 90 of fiber 82. Flow from flow path 12 partially flows through the through hole 94. Accordingly, differential pressure Pd causes a strain on the first section 90 of fiber 92 to deform towards the downstream direction. Wavelength changes from the first Bragg grating 86 are correlated to differential pressure Pd of flow 12. By monitoring wavelength changes of first Bragg grating 86, the differential pressure Pd can be obtained. In certain embodiments, Bragg grating 86 is situated lower or higher than through hole 94 to protect Bragg grating 86 from being damaged. In one embodiment, a groove 100 is provided at a downstream side of Bragg grating 86 to allow a sufficient deformation of first section 90 under differential pressure of the flow.

Housing 84 defines a side opening 96 adjacent to second section 91 of fiber 28. Sealing membrane 67 is provided between fiber 82 and side opening 96 for preventing flow 12 to flow into housing 84 through side opening 96 but can pass total pressure of flow 12 to second section 91 of fiber 82. Accordingly, second section 94 of fiber 28 is subject to total pressure Pt of flow 12, and thus wavelength change of second Bragg grating 87 is correlated to total pressure Pt of flow 12. By monitoring wavelength changes of second Bragg grating 87, the total pressure Pt of flow 12 can be obtained.

In certain embodiments, first and second sections 90 and 91 respectively have upper and lower ends secured to housing 87 with supports, and thus deflection of first and second sections 90 and 91 will not transfer to each other.

When temperature of third Bragg grating 88 has an increase ΔT, the Bragg wavelength of third Bragg grating 88 shifts toward a longer wavelength due to thermal expansion effects on refractive index modulation and the grating period of third Bragg grating 88. Thus, the temperature change within flow path 12 can be monitored by monitoring wavelength shifting of third Bragg grating 88. Housing 84 defines a cavity 98, and Bragg grating 88 in cavity 98 is sensitive to temperature change. In one embodiment, a rigid cover 102 is disposed in cavity 98 to further isolate any pressure from flow path 12 from impacting third section 92 of fiber 82.

In certain embodiments, wavelength changes on the first and second Bragg gratings 86 and 87 due to the temperature variations in the flow will be further calibrated based on the measurements of the third Bragg gratings 88.

Figure 10:
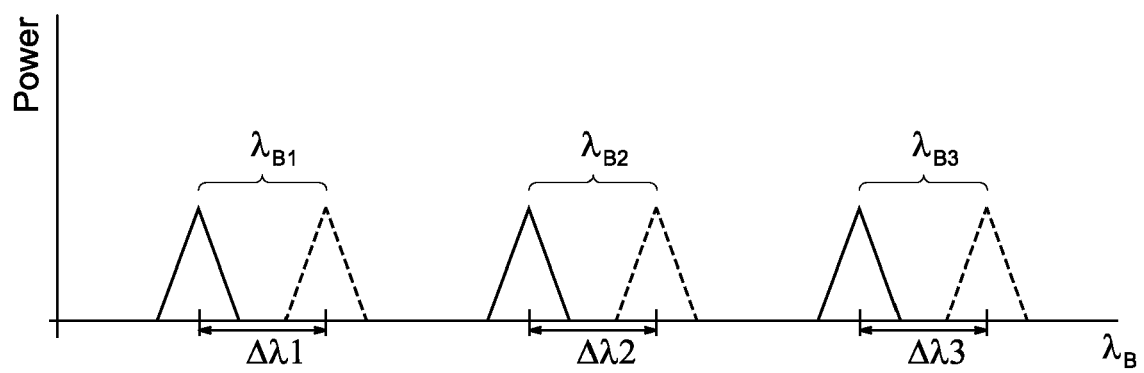
FIG. 10 illustrates wavelength changes of three Bragg gratings respectively due changes of total pressure, differential pressure, and temperature of the flow through embodiments of FIGS. 8 and 9.

Referring to FIG. 10, in one embodiment, first, second and third sets of Bragg gratings 86, 87 and 88 have different reflection spectrum and will reflect at different wavelengths $\lambda_{B1}$, $\lambda_{B2}$ and $\lambda_{B3}$. Thus detector 39 receives all three wavelengths $\lambda_{B1}$, $\lambda_{B2}$ and $\lambda_{B3}$ of first, second and third gratings 86, 87 and 88, and monitors changes therein respectively.

Unless defined otherwise, technical and scientific terms used herein have the same meaning as is commonly understood by one of skill in the art to which this invention belongs. The terms "first", "second", and the like, as used herein do not denote any order, quantity, or importance, but rather are used to distinguish one element from another. Also, the terms "a" and "an" do not denote a limitation of quantity, but rather denote the presence of at least one of the referenced items, and terms such as "front", "back", "bottom", and/or "top", unless otherwise noted, are merely used for convenience of description, and are not limited to any one position or spatial orientation.

While the invention has been described with reference to exemplary embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

It is to be understood that not necessarily all such objects or advantages described above may be achieved in accordance with any particular embodiment. Thus, for example, those skilled in the art will recognize that the systems and techniques described herein may be embodied or carried out in a manner that achieves or optimizes one advantage or group of advantages as taught herein without necessarily achieving other objects or advantages as may be taught or suggested herein.

Furthermore, the skilled artisan will recognize the interchangeability of various features from different embodiments. The various features described, as well as other known equivalents for each feature, can be mixed and matched by one of ordinary skill in this art to construct additional systems and techniques in accordance with principles of this disclosure.

The invention claimed is:

1. A fiber optic sensing system comprising:
a housing disposed in a flow path; and
a fiber optic sensor comprising:
an optical fiber secured in the housing and comprising a Bragg grating, the fiber being substantially perpendicular to the flow path, wherein the housing defines an opening at an upstream side to allow flow through the flow path to exert a pressure on the optical fiber and cause a deformation of the Bragg grating;
a light source for transmitting light to the optical fiber; and
a detector for detecting light filtered by the Bragg grating of the optical fiber and monitoring wavelength changes of the detected light, wherein the housing comprises a substantially right-angled tunnel with an upstream channel in an initial flow direction of the flow path and a downstream channel substantially perpendicular to the upstream channel and having a downstream opening at a downstream end thereof.

2. The fiber optic sensing system according to claim 1, wherein the fiber is disposed in the upstream channel, with one side subject to a total pressure of the flow, and another side subject to a static pressure of flow.

3. The fiber optic sensing system according to claim 2, wherein the fiber optic sensor further comprises a membrane secured to the housing and facing an end of the fiber with a cavity being defined in the housing between the membrane and the end of the fiber, and wherein the membrane is subject to the static pressure.

4. The fiber optic sensing system according to claim 1, wherein the Bragg grating is situated downstream of the opening.

5. A fiber optic sensing system comprising:
a housing disposed in a flow path; and
a fiber optic sensor comprising:
an optical fiber secured in the housing and comprising a Bragg grating, the fiber being substantially perpendicular to the flow path, wherein the housing defines an opening at an upstream side to allow flow through the flow path to exert a pressure on the optical fiber and cause a deformation of the Bragg grating;
a light source for transmitting light to the optical fiber; and
a detector for detecting light filtered by the Bragg grating of the optical fiber and monitoring wavelength changes of the detected light,
wherein the housing has a polygonal cross section, a tip of the polygonal cross section being generally directly facing the flow path, and at least one pair of sides,
wherein the housing has a triangular cross section with a tip of the triangle substantially facing the flow path and pair of sides, and wherein first, second and third openings are defined in the tip and the pair of sides.

6. The fiber optic sensing system according to claim 5, wherein the fiber includes a first, a second and a third fiber respectively have a portion facing the first, second and third openings.

7. The fiber optic sensing system according to claim 6, wherein the fiber optic sensor further comprises a controller for receiving signals from detector and estimating flow direction.

8. A fiber optic sensing system comprising:
a housing disposed in a flow path; and
a fiber optic sensor comprising:
an optical fiber secured in the housing and comprising a Bragg grating, the fiber being substantially perpendicular to the flow path, wherein the housing defines an opening at an upstream side to allow flow through the flow path to exert a pressure on the optical fiber and cause a deformation of the Bragg grating;
a light source for transmitting light to the optical fiber; and
a detector for detecting light filtered by the Bragg grating of the optical fiber and monitoring wavelength changes of the detected light, wherein the fiber comprises a first section including a first Bragg grating for measurement of a differential pressure within the flow path, a second section including a second Bragg grating for measurement a total pressure within the flow path, and a third section including a third Bragg grating for measurement of a temperature within the flow path.

9. The fiber optic sensing system according to claim 8, wherein the housing defines a through hole in the flow direction and adjacent to a portion of the first section of the fiber such that a differential pressure in the flow path causes a strain on the first section of the fiber.

10. The fiber optic sensing system according to claim 9, wherein the first Bragg grating is situated lower or higher than the through hole.

11. The fiber optic sensing system according to claim 10, wherein the housing defines a groove at a downstream side of the first Bragg grating for allowing deformation of the first section of the fiber.

12. The fiber optic sensing system according to claim 8, wherein the opening of the housing is adjacent to the second section of the fiber such that a total pressure in the flow path causes a strain on the second section of the fiber.

13. The fiber optic sensing system according to claim 12, wherein a sealing membrane is provided in the opening for preventing fluid from the flow path to flow into the housing while permitting pressure in the flow path to cause the strain on the second section of the fiber.

14. The fiber optic sensing system according to claim 8, wherein the third section of the fiber is secured with the housing so as not to be impacted by pressure within the flow path.

15. The fiber optic sensing system according to claim 14, wherein the housing comprises a cavity adjacent to the third section of the fiber, and the wherein the third section of the fiber has a portion having the third Bragg grating in the cavity, and wherein the fiber optic sensor further comprises a rigid cover for covering the cavity to isolating pressure to the third section of the fiber.

16. The fiber optic sensing system according to claim 8, wherein the first, second and third Bragg gratings have different grating patterns and reflect at different wavelengths.

17. A fiber optic sensing system comprising:
a housing disposed in a flow path; and
a fiber optic sensor comprising:
- an optical fiber secured in the housing, being substantially perpendicular to the flow path, and comprising a first section including a first Bragg grating for measurement of a differential pressure within the flow path, a second section including a second Bragg grating for measurement a total pressure within the flow path, and a third section including a third Bragg grating for measurement of a temperature within the flow path,
- a light source for transmitting light through the fiber; and
- a detector for detecting light filtered by the Bragg gratings of the optical fiber and monitoring wavelength changes of the detected light.

18. The fiber optic sensing system according to claim 17, wherein the housing defines a through hole in the flow direction and adjacent to a portion of the first section of the fiber such that a differential pressure in the flow path causes a strain on the first section of the fiber.

19. The fiber optic sensing system according to claim 17, wherein the opening of the housing is adjacent to the second section of the fiber such that a total pressure in the flow path causes a strain on the second section of the fiber.

20. The fiber optic sensing system according to claim 19, wherein a sealing membrane is provided in the opening for preventing fluid from the flow path to flow into the housing while permitting pressure in the flow path to cause the strain on the second section of the fiber.

21. The fiber optic sensing system according to claim 17, wherein the third section of the fiber is secured with the housing so as not to be influenced by pressure within the flow path.

22. The fiber optic sensing system according to claim 21 wherein the housing comprises a cavity adjacent to the third section of the fiber, and the wherein the third section of the fiber has a portion having the third Bragg grating in the cavity, and wherein the fiber optic sensor further comprises a rigid cover for covering the cavity to isolating pressure to the third section of the fiber.

23. A fiber optic sensing system comprising:
a housing; and
a fiber optic sensor comprising:
- an optical fiber having an upper end and a lower end secured in the housing, and a Bragg grating between the upper and lower ends, the fiber being substantially perpendicular to the flow path, wherein the housing defines an opening at an upstream side to allow flow through the flow path to exert a pressure on the optical fiber and cause a deformation of the Bragg grating;
- a light source for transmitting light to the optical fiber; and
- a detector for detecting light filtered by the Bragg grating of the optical fiber and monitoring wavelength changes of the detected light.

24. The fiber optic sensing system according to claim 23, wherein the optical fiber further comprises a sealing membrane for preventing flow in the flow path from flowing into the housing from the opening.

25. The fiber optic sensing system according to claim 23, wherein the housing has a polygonal cross section, a tip of the polygonal cross section being generally directly facing the flow path, and at least one pair of sides.

\* \* \* \* \*